United States Patent [19]
Liu

[11] Patent Number: 5,839,095
[45] Date of Patent: Nov. 17, 1998

[54] MULTIMEDIA CONTROL CENTER FOR CONTROLLING PERIPHERAL DEVICES OF A PERSONAL COMPUTER

[76] Inventor: Johny Liu, 3F No. 1 Lane 154, Sec 3, Cheng-Gong Road, Neihu, Taipei, Taiwan

[21] Appl. No.: 660,265

[22] Filed: Jun. 7, 1996

[51] Int. Cl.⁶ .................................................. G06F 13/00
[52] U.S. Cl. ................... 702/122; 364/146; 395/183.01; 345/335; 345/349
[58] Field of Search .................................. 395/326, 329, 395/340, 680–682, 514 R, 290, 183.01; 364/DIG. 1, DIG. 2, 231, 238.3, 280, 514 A, 240.5, 267; 345/156, 168, 173, 335, 349; 348/571; 702/122

[56] References Cited

U.S. PATENT DOCUMENTS

| | | | |
|---|---|---|---|
| 5,192,999 | 3/1993 | Graczyk et al. .......................... | 348/552 |
| 5,265,252 | 11/1993 | Rawson, III et al. .................... | 395/681 |
| 5,280,621 | 1/1994 | Barnes et al. ........................... | 364/238.3 |
| 5,386,360 | 1/1995 | Wilson et al. ............................ | 364/146 |
| 5,412,772 | 5/1995 | Monson .................................... | 364/280 |
| 5,428,730 | 6/1995 | Baker et al. .............................. | 395/154 |
| 5,488,695 | 1/1996 | Cutter ....................................... | 395/290 |
| 5,491,789 | 2/1996 | Aramaki et al. .......................... | 364/267 |
| 5,617,539 | 4/1997 | Ludwig et al. ..................... | 395/200.35 |

*Primary Examiner*—John E. Barlow, Jr.
*Assistant Examiner*—Bryan Bui

[57] ABSTRACT

This invention relates to a multimedia control center for controlling peripheral devices of a personal computer. The personal computer system comprises a processor for performing multi-tasking applications, an application program executed in the processor, an input device for receiving user inputs for the application program, a peripheral device for performing a peripheral function, a device driver installed in the processor for controlling the peripheral device according to peripheral control signals, and a multimedia control program for receiving the peripheral control signals generated by a multimedia control center according to user inputs and passing the signals to the device driver to control the peripheral device. Such design allows a user to control the peripheral device by using the multimedia control center without suspending or terminating his current application program executed in the processor.

7 Claims, 3 Drawing Sheets

MULTIMEDIA CONTROL CENTER FOR CONTROLLING PERIPHERAL DEVICES OF A PERSONAL COMPUTER

BACKGROUND OF THE INVENTION

1. Field of the Invention

The present invention relates to a personal computer, and more particularly, to a multimedia control center connected to the personal computer for controlling peripheral devices of the personal computer.

2. Description of the Prior Art

Multimedia applications are very popular in today's personal computer world. Many peripheral devices such as CD-ROM player, radio, speaker, television, etc, are integrated into personal computers by end users. Although window-based applications or some other software allow a user to run multiple parallel sessions in the same time such as editing a file while printing several pages through a printer connected to the personal computer, but there are several problems by using such multi-session method to control peripheral devices. First, if an peripheral control application can not be started by using an application currently running in the computer, e.g. playing a song in a CD-ROM by using an optic disk drive while editing a file, a user has to suspend or terminate his current application and then start the peripheral control application. Such interruption is very inconvenient. Second, once the peripheral control application is started, it usually requires extra attentions when some conditions happen. Such conditions are usually presented as a pop-out message over the monitor screen which interrupts the current application and requires immediate attention. Such interruption is also very boring. But the user has to stop his work and handle the condition immediately or he will not be able to proceed his current application.

These problems come from a basic application design practice of personal computers. Most personal computer applications are designed to serve one person for performing one task at one time. Almost all the applications running in a personal computer need to display some outputs over the computer monitor and receive user inputs from an input device such as a keyboard or a mouse. If two or more applications are running in parallel in a personal computer, switching between these applications and sharing of the monitor and the input device are very inconvenient and always causes problems. Almost all the applications use the same monitor to display messages and use the same input device to receive user inputs. Each application assumes that the user who runs it would always like to deal with it immediately so that it constantly interrupts the current application and forces the user to deal with a newly happened condition immediately.

SUMMARY OF THE INVENTION

It is therefore the goal of the present invention to provide a new personal computer system to solve the above mentioned problems. Briefly, in a preferred embodiment, the present invention includes a data processing system comprising:

(1) a processor for performing multi-tasking applications;
(2) a display connected to the processor;
(3) an application program executed in the processor which displays video outputs on the display;
(4) at least an input device connected to the processor for receiving user inputs for the application program;
(5) a peripheral device connected to the processor for performing a peripheral function;
(6) device driver means installed in the processor for controlling the peripheral device according to peripheral control signals;
(7) multimedia control means for receiving the peripheral control signals generated by a user and passing the signals to the device driver means to control the peripheral device;

wherein the peripheral device is controlled by the device driver means according to the peripheral control signals transmitted from the multimedia control means without suspending or terminating the application program executed in the processor. The data processing system further comprises a multimedia interface circuit connected to the processor for generating the peripheral control signals according to user inputs and an interface driver means installed in the processor for controlling the multimedia interface circuit and transmitting the peripheral control signals to the multimedia control means. The multimedia control means further transmits message signals generated by the device driver means to the interface driver means and the multimedia interface circuit further comprises a display means for displaying the message signals wherein the interface driver means displays the message signals received from the multimedia control means over the display means of the multimedia interface circuit.

It is an advantage of the present invention that it provides a multimedia control means for receiving the peripheral control signals to control the peripheral device without suspending or terminating the application program executed in the processor.

It is another advantage of the present invention that it provides a multimedia interface circuit which can be used to generate the peripheral control signals to control the peripheral device while the input device still can be used for receiving user inputs for the application program in the same time.

It is still another advantage of the present invention that it provides a display means over the multimedia interface circuit for displaying the message signals generated by the device driver means so that a user can directly see the response from the peripheral device over the display means instead of from the display of the data processing system.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
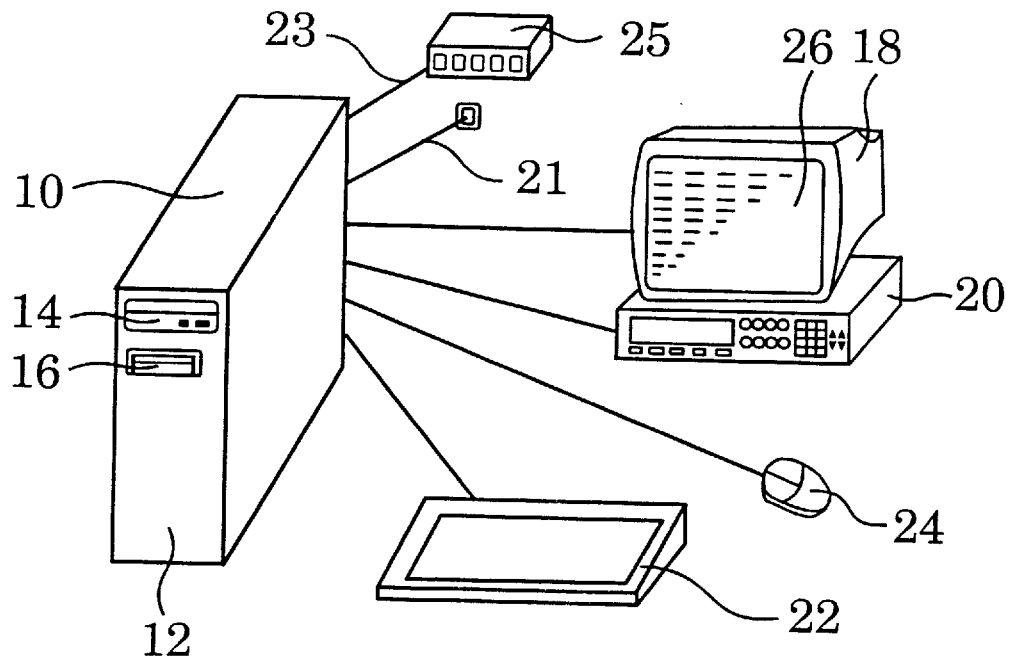
FIG. 1 is a perspective view of a personal computer system according to the present invention.

FIG. 1 is a perspective view of a personal computer system 10 according to the present invention. The system 10 comprises a processor 12 for performing multi-tasking applications, an optic disk drive 14 and a floppy disk drive 16 installed in the processor 12, a display 18 connected to the processor 12 for displaying video outputs 26 of an application program such as word processor executed in the processor 12, a multimedia control center 20 connected to the processor 12 for controlling various peripheral devices of the system 10 such as the optic disk drive 14, a telephone line 21 which links a modem installed in the processor 12 to a telephone network, a network cable 23 connected a network interface card installed in the processor 12 to a hub 25 of a computer network, a keyboard 22 and a mouse 24 connected to the processor 12 for receiving user inputs for the application program. Since the peripheral devices can be directly controlled by using the multimedia control center 20, the execution of the application program running in the processor 12 can be maintained and no interruption is needed.

Figure 2:
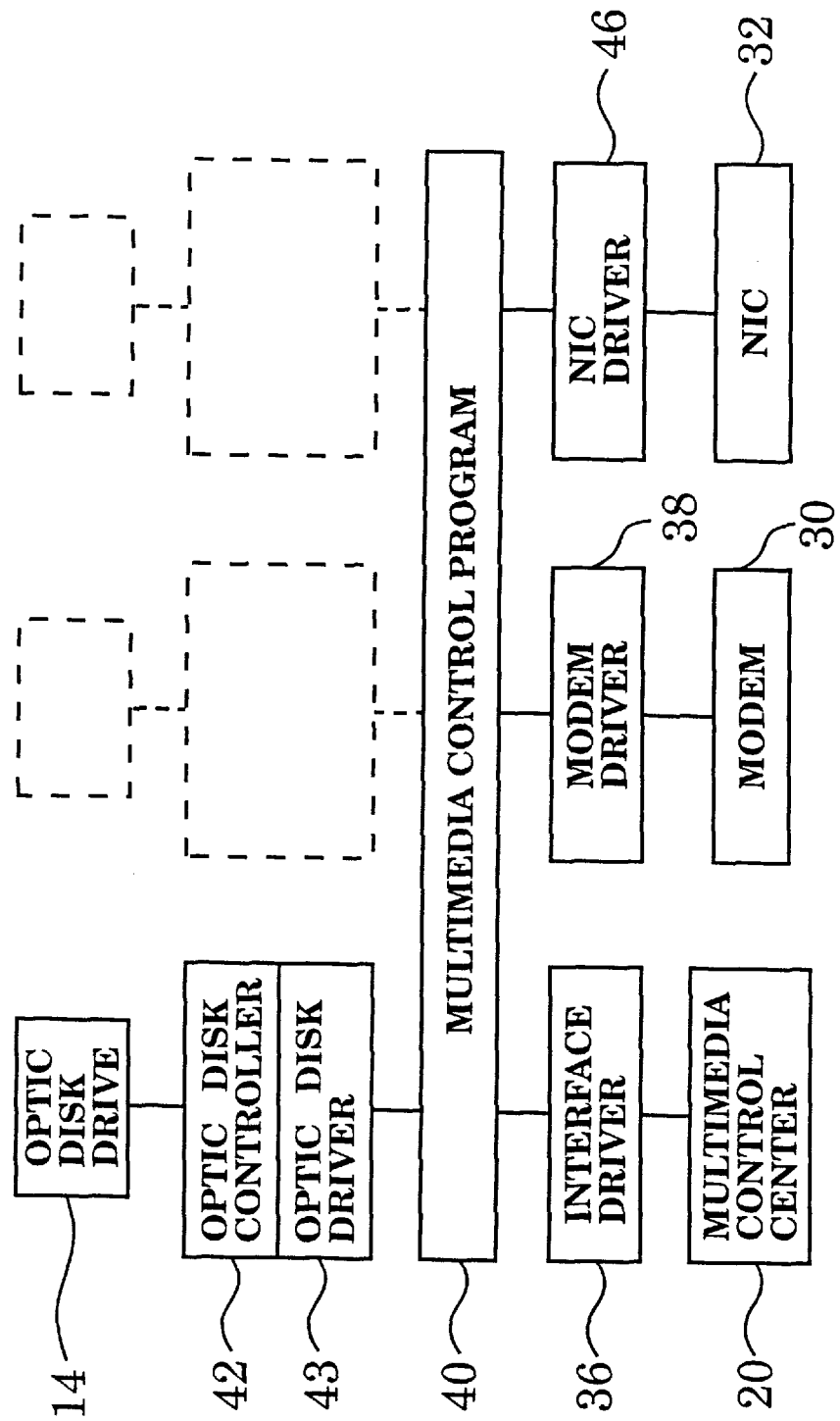
FIG. 2 is a block diagram which shows part of the configuration of the personal computer system shown in FIG. 1.

FIG. 2 is a block diagram which shows part of the configuration of the personal computer system 10 shown in FIG. 1. It shows that the system 10 comprises several input devices such as multimedia control center 20, modem 30, network interface card 32, etc., which can be used to control one or more peripheral devices connected to the processor 12 by using the multimedia control program 40. Only one peripheral device which is an optic disk drive 14 is shown in FIG. 2. The optic disk drive 14 is used for playing CD-ROM (compact disk—read-only-memory). An device driver is installed in the processor 12 which comprises an optic disk controller 42 which is an electronic chip for controlling the drive 14 and an optic disk driver 43 which is a software program for controlling the optic disk controller 42 according to peripheral control signals transmitted from the multimedia control program 40.

The multimedia control program 40 is responsible for transmitting the peripheral control signals generated by an input device such as the multimedia control center 20 according to user inputs to a device driver of a selected peripheral device. It also transmits some message signals generated by the device driver of the selected peripheral device back to the input device. By using the multimedia control program 40 to transmit the peripheral control signals to control a peripheral device, a user can concentrate on his current application and there is no need for him to suspend or terminate his current application for controlling the peripheral device.

The multimedia control center 20 is used as a multimedia interface circuit for generating peripheral control signals according to user inputs to control various peripheral devices, and the interface driver 36 installed in the processor 12 is used for controlling the multimedia control center 20 and transmitting the peripheral control signals received from the multimedia control center 20 to the multimedia control program 40.

Figure 3:
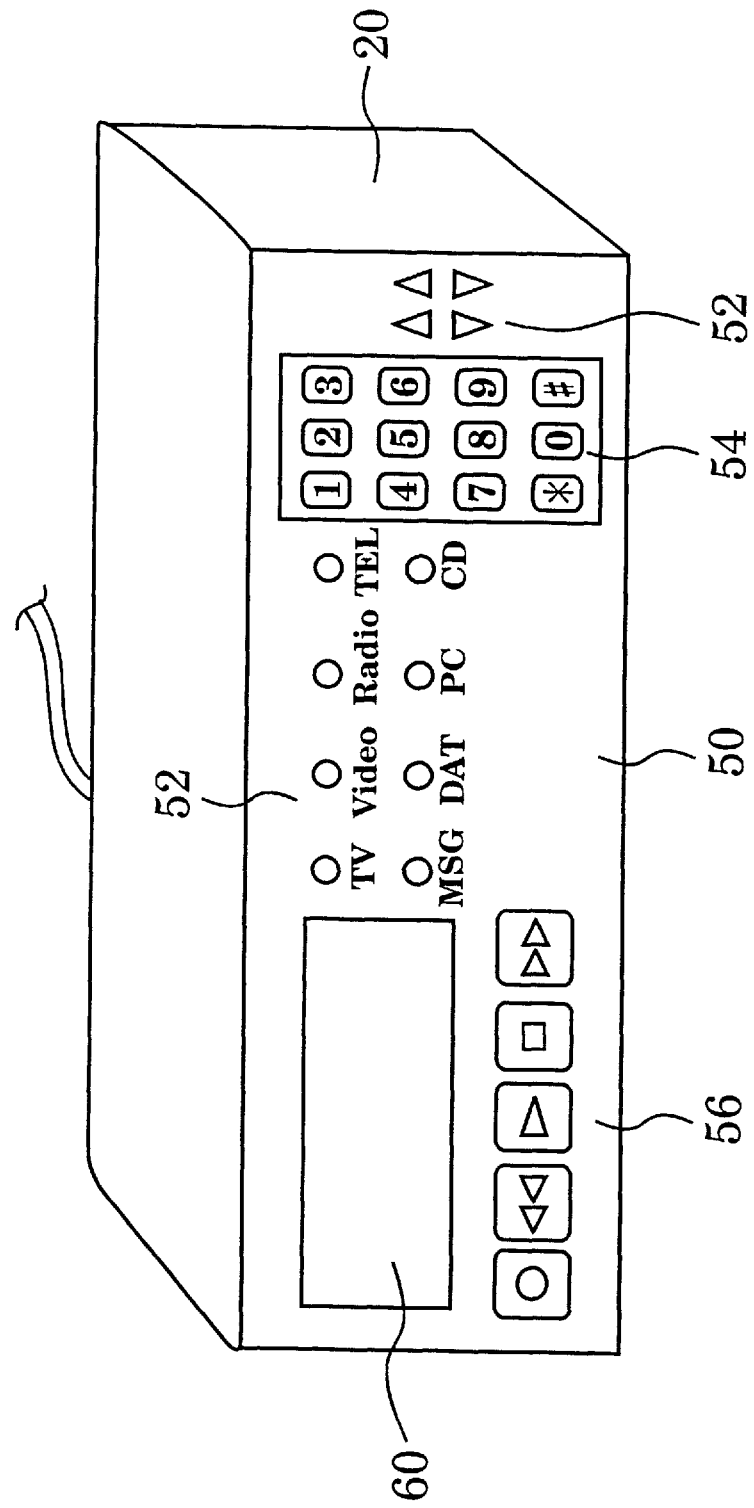
FIG. 3 is a front perspective view of the multimedia control center shown in FIG. 1.

Please refer to FIG. 3 for the details of the front panel 50 of the multimedia control center 20. The multimedia control center 20 comprises a multimedia control panel 50 having a plurality of keys for generating the peripheral control signals according to user inputs. The front panel 50 comprises five operation control keys 56 for controlling the operations of a drive, several selection keys 52 for selecting a peripheral device, a digital panel 54 for entering digits, four arrow keys 58 for controlling volume or speed of a peripheral device, and a display 60 which is an LCD (liquid crystal display) panel for displaying message signals transmitted from the peripheral device. Once a peripheral device is selected by using a selection key 52, it can be controlled by using other keys on the panel 50 and the message signals of the peripheral device is displayed over the LCD panel 60. The message signals is originally generated by the device driver of a peripheral device. It is first transmitted to the multimedia control program 40. The multimedia control program 40 may convert the message signals into proper format so that it can be displayed over the LCD panel 60 of the multimedia control center 20. The converted message signals are again transmitted to the interface driver 36 and then displayed over the LCD panel 60 of the multimedia control center 20.

The modem 30 linked to a telephone network through a telephone line 21 can also be used as a multimedia interface circuit for receiving the peripheral control signals generated from a remote computer by a user. The modem driver 38 installed in the processor 12 is used for controlling the modem 30 and transmitting the received peripheral control signals to the multimedia control program 40. The network interface card 32 is also used as a multimedia interface circuit for controlling the peripheral devices. The network interface card 32 is linked to a hub 25 of a computer network through a network cable 23 for receiving the peripheral control signals generated by another network computer user. And the network interface card driver 46 installed in the processor 12 is used for controlling the network interface card 32 and transmitting the received peripheral control signals to the multimedia control program 40.

Figure 4:
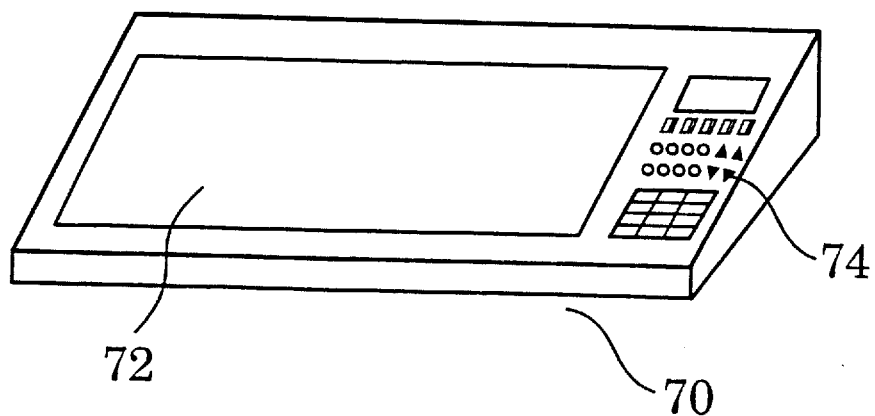
FIG. 4 is a keyboard integrated with a multimedia control circuit according to the present invention.

Instead of building a multimedia interface circuit in an independent box such as the multimedia control center 20, the multimedia control circuit can also be integrated into a traditional input device such as a keyboard for controlling various peripheral devices. FIG. 4 shows a keyboard 70 with a multimedia control panel 74 integrated in it according to the present invention. The keyboard 70 comprises a plurality of keys 72 for receiving user inputs for application programs and an multimedia control panel 74 built next to the keys 72 for receiving the peripheral control signals. The multimedia control panel 74 is a multimedia interface circuit for generating peripheral control signals which is controlled by an interface driver which is similar to the interface driver 36 shown in FIG. 2. The interface driver is also responsible for controlling the keys 72 of the keyboard 70 and all the inputs generated from the keyboard 70 will be distributed to the right targets by the interface driver.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A data processing system comprising:
   (1) a processor for performing multi-tasking applications;
   (2) a display connected to the processor;
   (3) an application program executed in the processor which displays video outputs on the display;
   (4) input device means connected to the processor for receiving user inputs for the application program;
   (5) peripheral device means connected to the processor for performing a peripheral function;
   (6) device driver means installed in the processor for controlling the peripheral device means according to peripheral control signals;
   (7) multimedia control means for receiving the peripheral control signals generated by a user and passing the signals to the device driver means to control the peripheral device means without using the display of the processor;

(8) a multimedia interface circuit connected to the processor with a multimedia control panel having a plurality of keys for generating the peripheral control signals according to user inputs; and (9) an interface driver means installed in the processor for controlling the multimedia interface circuit and transmitting the peripheral control signals to the multimedia control means;

wherein the peripheral device means is controlled by the device driver means according to the peripheral control signals transmitted from the multimedia control means without suspending or terminating the application program executed in the processor; and wherein the multimedia control means further transmits message signals generated by the device driver means to the interface driver means and the multimedia interface circuit further comprises a display means for displaying the message signals wherein the interface driver means displays the message signals received from the multimedia control means over the display means of the multimedia interface circuit.

2. The data processing system of claim 1 wherein the display means is an LCD (liquid crystal display) panel for displaying the message signals from the device driver means.

3. The data processing system of claim 1 wherein the multimedia interface circuit is built in the input device and wherein the interface driver means controls both the input device and the multimedia interface circuit.

4. The data processing system of claim 3 wherein the input device is a keyboard having a plurality of keys for receiving user inputs for the application program with the multimedia interface circuit built next to the keys for receiving the peripheral control signals.

5. The data processing system of claim 1 wherein the multimedia interface circuit comprises a modem electrically linked to a telephone network for receiving the peripheral control signals.

6. The data processing system of claim 1 wherein the multimedia interface circuit comprises a network interface card electrically linked to a computer network for receiving the peripheral control signals.

7. The data processing system of claim 1 wherein the peripheral device means comprises an optic disk drive and the device driver means comprises an optic disk controller for controlling the optic disk drive and an optic disk driver for controlling the optic disk controller.

* * * * *